United States Patent
Veeningen et al.

(10) Patent No.: US 11,646,876 B2
(45) Date of Patent: May 9, 2023

(54) DISTRIBUTING A COMPUTATION OUTPUT

(71) Applicant: KONINKLIJKE PHILIPS N.V., Eindhoven (NL)

(72) Inventors: Meilof Geert Veeningen, Eindhoven (NL); Sebastiaan Jacobus Antonius De Hoogh, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 488 days.

(21) Appl. No.: 16/633,992

(22) PCT Filed: Jul. 31, 2018

(86) PCT No.: PCT/EP2018/070683
§ 371 (c)(1),
(2) Date: Jan. 24, 2020

(87) PCT Pub. No.: WO2019/025415
PCT Pub. Date: Feb. 7, 2019

(65) Prior Publication Data
US 2021/0091929 A1  Mar. 25, 2021

Related U.S. Application Data

(60) Provisional application No. 62/631,979, filed on Feb. 19, 2018, provisional application No. 62/539,062, filed on Jul. 31, 2017.

(51) Int. Cl.
  *H04L 9/08* (2006.01)
  *G06F 7/02* (2006.01)
  *H04L 9/32* (2006.01)

(52) U.S. Cl.
  CPC ............... *H04L 9/085* (2013.01); *G06F 7/02* (2013.01); *H04L 9/0869* (2013.01); *H04L 9/3242* (2013.01); *H04L 2209/046* (2013.01)

(58) Field of Classification Search
  CPC ..... H04L 9/085; H04L 9/0869; H04L 9/3242; H04L 2209/046; H04L 2209/46; G06F 7/02
  See application file for complete search history.

(56) References Cited

U.S. PATENT DOCUMENTS 9,432,342 B1 *  8/2016  Kothari .................. H04L 9/0822
9,536,114 B1 *  1/2017  El Defrawy ............ H04L 63/04
(Continued)

OTHER PUBLICATIONS

International Search Report for PCT/EP2018/070683 filed Jul. 31, 2018.
(Continued)

*Primary Examiner* — David Garcia Cervetti

(57) ABSTRACT

According to an aspect, there is provided a method of operating a first computing node to distribute a computation output, the method comprising: determining a first random mask; providing the first random mask as a private input to a computation by a first evaluator node and a second evaluator node; receiving, from each of the first evaluator node and the second evaluator node, a respective masked computation output, wherein each masked computation output is a function of an output of the computation and the first random mask; if the received respective masked computation outputs match, determining the output of the computation from the received masked computation output and the first random mask; and sending information to the first evaluator node and the second evaluator node to enable the first evaluator node and the second evaluator node to determine the output of the computation from the respective masked computation output.

31 Claims, 5 Drawing Sheets

(56) References Cited

U.S. PATENT DOCUMENTS

| | | | | |
|---|---|---|---|---|
| 10,177,922 | B1* | 1/2019 | Hamlet | H04L 9/3278 |
| 10,235,335 | B1* | 3/2019 | Speers | G06F 16/332 |
| 10,496,828 | B2* | 12/2019 | Bellala | G06F 21/6218 |
| 2005/0210248 | A1* | 9/2005 | Graveman | H04L 9/3242 |
| | | | | 713/168 |
| 2007/0116283 | A1* | 5/2007 | Tuyls | H04L 9/3013 |
| | | | | 380/255 |
| 2010/0070292 | A1* | 3/2010 | Kenedy | G06Q 40/08 |
| | | | | 705/40 |
| 2011/0087885 | A1* | 4/2011 | Lerner | H04L 63/065 |
| | | | | 713/168 |
| 2013/0275545 | A1* | 10/2013 | Baptist | H04L 67/01 |
| | | | | 709/215 |
| 2014/0153714 | A1* | 6/2014 | Lambert | H04L 9/3236 |
| | | | | 380/28 |
| 2014/0156998 | A1* | 6/2014 | Lambert | H04L 9/3273 |
| | | | | 713/182 |
| 2015/0169904 | A1* | 6/2015 | Leiserson | G06F 21/71 |
| | | | | 713/189 |
| 2016/0335440 | A1* | 11/2016 | Clark | H04L 9/085 |
| 2017/0033921 | A1* | 2/2017 | Michiels | G06F 21/14 |
| 2017/0132420 | A1* | 5/2017 | Shetty | G06F 21/602 |
| 2017/0222798 | A1* | 8/2017 | Morel | G06F 21/72 |
| 2018/0174493 | A1* | 6/2018 | Ohori | H04L 9/0866 |
| 2019/0251248 | A1* | 8/2019 | Madden | G06F 21/31 |
| 2020/0242466 | A1* | 7/2020 | Mohassel | H04L 9/008 |
| 2020/0304293 | A1* | 9/2020 | Gama | G06F 17/16 |
| 2021/0044609 | A1* | 2/2021 | Keshtkarjahromi | G06F 8/61 |
| 2021/0091929 | A1* | 3/2021 | Veeningen | H04L 9/00 |
| 2021/0176252 | A1* | 6/2021 | Tsuchida | H04L 9/085 |
| 2022/0075862 | A1* | 3/2022 | Torre | H04W 12/06 |

OTHER PUBLICATIONS

Kolesnikov, V. et al., "Improved Secure Two-Party Computation via Information-Theoretic AGarbled Circuits", (Sep. 5, 2012), Security and Cryptography for Networks, Springer Berlin Heidelberg, pp. 205-221.

Asharov, G. et al., "Fair and Efficient Secure Multiparty Computation with Reputation Systems", (Dec. 1, 2013) Medical Image Computing and Computer Assisted Intervention—MICCAI 2015: 18th International Conference, Munich, German.

Gelles, R. et al., "Multiparty Proximity Testing with Dishonest Majority from Equality Testing", Internaitonal Association for Cryptologic Research, vol. 20120705:121931, (Jul. 4, 2012), pp. 1-23.

Damgard, I. et al., "Practical covertly secure MPC for dishonest majority—or: Breaking the SPDZ limits".Computer Security—ESORICS 2013—18th European Symposium on Research in Computer Security, Egham, UK, Sep. 9-13, 2013, pp. 1-18, Proceedings 2013.

Damgard, I. et al., "Multiparty Computation for Dishonest Majority: From Passive to Active Security at Low Cost". LNCS, vol. 6223, Springer 2010.

Jakobsen, T.P. et al., "A framework for outsourcing of secure computation". IACR Cryptology ePrint Archive, 2016:37.

Dolev, D. et al., "Authenticated Algorithms for Byzantine Agreement", Siam J. Comput., 12(4), 656-666.

Baum, C. et al., "Publicly Auditable Secure Multi-Party Computation". 9th Conference on Security and Cryptography for Networks (SCN 2014).

Keller, M. et al., "An Architecture for Practical Actively Secure MPC with Dishonest Majority". CCS'13, Nov. 4-8, 2013, Berlin, Germany. ACM 978-1-4503-2477—Sep. 13, 2011.

Zero-Knowledge Protocols and Multiparty Computation, PhD Thesis by Valerio Pastro, 2013.

Baum, C. et al., "Better Preprocessing for Secure Multiparty Computation". Computer Security—ESORICS 2013, Springer, published 2013, vol. 8134, pp. 1-18.

\* cited by examiner

DISTRIBUTING A COMPUTATION OUTPUT

CROSS-REFERENCE TO PRIOR APPLICATIONS

This application is the U.S. National Phase application under 35 U.S.C. § 371 of International Application No. PCT/EP2018/070683, filed on Jul. 31, 2018, which claims the benefit of U.S. Patent Application No. 62/631,979 and 62/539,062, filed on Feb. 19, 2018 and Jul. 31, 2017. These applications are hereby incorporated by reference herein.

FIELD OF THE INVENTION

This disclosure relates to the distribution of a computation output, and in particular to the distribution of a computation output computed by two parties using multiparty computation techniques to each other and another node.

BACKGROUND OF THE INVENTION

SPDZ is a family of multiparty computation (MPC) protocols along the lines of a "preprocessing model", where the computation assumes the availability of certain preprocessing information (that can be used only once). If this preprocessing data is correct, then in the 2-party variant, each party is assured that the computation is performed correctly even if the other party is corrupted, i.e. it is known as "1-out-of-2 secure". The preprocessing information most significantly includes multiplication triples: additive shares of values a; b; c such that c=a·b (modulo a prime, as described in "Practical covertly secure MPC for dishonest majority—or: Breaking the SPDZ limits" by I. Damgard, M. Keller, E. Larraia, V. Pastro, P. Scholl, and N. P. Smart, in Computer Security—ESORICS 2013-18th European Symposium on Research in Computer Security, Egham, UK, Sep. 9-13, 2013, Proceedings, pages 1-18, 2013).

It is thought that the SPDZ protocol for 1-out-of-2 MPC (i.e. secure if one out of two parties is corrupted) in the preprocessing model can be converted into a protocol for 1-out-of-3 MPC (i.e. secure if one of three parties is corrupted) in the plain model without preprocessing. For this, one party (referred to as a "dealer") carries out the preprocessing and provides the results to the other two parties (referred to as the "evaluators"), who then carry out the two-party computation (2PC) protocol among themselves. This requires a method by which the evaluators can verify that the received preprocessing information is correct, and it requires a method by which the dealer, who is not a party in the 1-out-of-2 MPC, provides inputs to and obtains outputs of the computation.

For the former, i.e. verifying correctness of the preprocessing information, one straightforward way is to use so-called "cut-and-choose" techniques: for instance, the dealer generates sets of preprocessing information 40 times; the evaluators pick 39 of these sets at random, exchange their respective parts of the preprocessing information, and check whether it was correctly generated; and if so, they use the 40$^{th}$ set of preprocessing information in the remainder of the protocol. A more complicated way of verifying correctness with stronger security guarantees would be to apply the triple verification techniques from "Multiparty Computation for Dishonest Majority: From Passive to Active Security at Low Cost" by I. Damgard and C. Orlandi, LNCS, volume 6223, Springer, 2010 in the present setting with a trusted dealer.

A straightforward way of doing the latter, i.e., letting the dealer provide inputs to and obtain outputs from the computation, was suggested (in a slightly different setting) in "A framework for outsourcing of secure computation" by T. P. Jakobsen, J. B. Nielsen, and C. Orlandi in IACR Cryptology ePrint Archive, 2016:37, 2016, in which the dealer provides inputs by providing secret shares of the inputs, a MAC (Message Authentication Code) key, and a MAC on the inputs using this MAC key, and the evaluators verify authenticity by re-computing the MAC; and the dealer obtains outputs by letting the evaluators together determine the computation output and both send the output of the computation to the dealer, who accepts the computation result if, and only if, the two values match.

More generally, any two-party computation protocol, i.e., any MPC protocol for two parties (including protocols that do not employ preprocessing), can be turned into a three-party computation protocol by letting a third party (that, if there is no preprocessing, does not have to act as a dealer) provide inputs to and obtain outputs from the computation using the above approach.

However, the above technique for distributing the computation output between the three parties does not satisfy the desirable property of 'fairness'. Fairness means that either all parties get the computation result, or none of them do (assuming that at most one of the three parties is actively corrupted). In the above technique, one of the evaluators can simply send a wrong computation result to the dealer, and the dealer has no way of telling which of the two evaluators sent the correct computation result. A further problem is that a first evaluator can wait until the second evaluator sends the information that the first evaluator needs to determine the output and terminate before either the second evaluator or the dealer learns the computation result.

There is therefore a need for improvements in the distribution of a computation output that does guarantee fairness.

SUMMARY OF THE INVENTION

According to a first specific aspect, there is provided a computer-implemented method of operating a first computing node to distribute a computation output, the method comprising determining a first random mask; providing the first random mask as a private input to a computation by a first evaluator node and a second evaluator node; receiving, from each of the first evaluator node and the second evaluator node, a respective masked computation output, wherein each masked computation output is a function of an output of the computation and the first random mask; if the received respective masked computation outputs match, determining the output of the computation from the received masked computation output and the first random mask; and sending information to the first evaluator node and the second evaluator node to enable the first evaluator node and the second evaluator node to determine the output of the computation from the respective masked computation output.

According to a second aspect, there is provided a computer-implemented method of operating a first evaluator node to distribute a computation output, the method comprising performing a computation with a second evaluator node to determine a first masked computation output, wherein the first masked computation output is a function of an output of the computation and a first random mask, wherein the first random mask is provided as a private input to the computation by a first computing node; sending the first masked computation output to the first computing node; receiving information from the first computing node; and determining a first possible computation output from the received information and the first masked computation output.

According to a third aspect, there is provided a first computing node for use in distributing a computation output, wherein the first computing node is configured to: determine a first random mask; provide the first random mask as a private input to a computation by a first evaluator node and a second evaluator node; receive, from each of the first evaluator node and the second evaluator node, a respective masked computation output, wherein each masked computation output is a function of an output of the computation and the first random mask; if the received respective masked computation outputs match, determine the output of the computation from the received masked computation output and the first random mask; and send information to the first evaluator node and the second evaluator node to enable the first evaluator node and the second evaluator node to determine the output of the computation from the respective masked computation output.

According to a fourth aspect, there is provided a first evaluator node for distributing a computation output, wherein the first evaluator node is configured to: perform a computation with a second evaluator node to determine a first masked computation output, wherein the first masked computation output is a function of an output of the computation and a first random mask, wherein the first random mask is provided as a private input to the computation by a first computing node; send the first masked computation output to the first computing node; receive information from the first computing node; and determine a first possible computation output from the received information and the first masked computation output.

According to a fifth aspect, there is provided a computer-implemented method of operating a first evaluator node to distribute a computation output, the method comprising: receiving a first secret value secret share of a secret value from a dealer node; determining, with a second evaluator node, a random mask; performing a computation with the second evaluator node to determine: (i) a first masked computation output secret share of a masked computation output, wherein the masked computation output is a function of an output of the computation and the random mask; and (ii) a first Message Authentication Code, MAC, secret share of a MAC of the masked computation output, wherein the MAC of the masked computation output is a function of the masked computation output and the secret value; sending the first masked computation output secret share and the first MAC secret share to the dealer node; receiving a first masked computation output from the dealer node; receiving a second computation output secret share from the second evaluator node, wherein the second computation output secret share is a secret share, determined by the second evaluator node, of the output of the computation; determining a first possible computation output from a first computation output secret share and the received second computation output secret share, wherein the first computation output secret share is a secret share, determined by the first evaluator node when performing the computation, of the output of the computation; determining a second possible computation output from the received first masked computation output and the random mask; determining the output of the computation from the first possible computation output and the second possible computation output; sending information to the dealer node to enable the dealer node to determine the output of the computation from the first masked computation output.

According to a sixth aspect, there is provided a computer-implemented method of operating a dealer node to distribute a computation output, the method comprising: receiving, from a first evaluator node, a first masked computation output secret share of a masked computation output and a first Message Authentication Code, MAC, secret share of a MAC of the masked computation output, wherein the masked computation output is a function of an output of the computation and a random mask, and wherein the MAC of the masked computation output is a function of the masked computation output and a secret value; receiving, from the second evaluator node, a second masked computation output secret share of the masked computation output and a second MAC secret share of the MAC of the masked computation output; verifying the MAC of the masked computation output using the first masked computation output secret share, the first MAC secret share, the second masked computation output secret share, the second MAC secret share, and the secret value, wherein verifying the MAC of the masked computation output comprises combining the first masked computation output secret share and the second masked computation output secret share to determine the first masked computation output; if the MAC of the masked computation output is verified, sending the determined first masked computation output to the first evaluator node and the second evaluator node; receiving information from one or both of the first evaluator node and the second evaluator node; and determining the output of the computation from the first masked computation output and the received information.

According to a seventh aspect, there is provided a first evaluator node for use in distributing a computation output, wherein the first evaluator node is configured to: receive a first secret value secret share of a secret value from a dealer node; determine, with a second evaluator node, a random mask; perform a computation with the second evaluator node to determine: (i) a first masked computation output secret share of a masked computation output, wherein the masked computation output is a function of an output of the computation and the random mask; and (ii) a first Message Authentication Code, MAC, secret share of a MAC of the masked computation output, wherein the MAC of the masked computation output is a function of the masked computation output and the secret value; send the first masked computation output secret share and the first MAC secret share to the dealer node; receive a first masked computation output from the dealer node; receive a second computation output secret share from the second evaluator node, wherein the second computation output secret share is a secret share, determined by the second evaluator node, of the output of the computation; determine a first possible computation output from a first computation output secret share and the received second computation output secret share, wherein the first computation output secret share is a secret share, determined by the first evaluator node when performing the computation, of the output of the computation; determine a second possible computation output from the received first masked computation output and the random mask; determine the output of the computation from the first possible computation output and the second possible computation output; and send information to the dealer node to enable the dealer node to determine the output of the computation from the first masked computation output.

According to an eighth aspect, there is provided a dealer node for distributing a computation output, wherein the dealer node is configured to: receive, from a first evaluator node, a first masked computation output secret share of a masked computation output and a first Message Authentication Code, MAC, secret share of a MAC of the masked computation output, wherein the masked computation output is a function of an output of the computation and a random mask, and wherein the MAC of the masked computation output is a function of the masked computation output and a secret value; receive, from the second evaluator node, a second masked computation output secret share of the masked computation output and a second MAC secret share of the MAC of the masked computation output; verify the MAC of the masked computation output using the first masked computation output secret share, the first MAC secret share, the second masked computation output secret share, the second MAC secret share, and the secret value, wherein verifying the MAC of the masked computation output comprises combining the first masked computation output secret share and the second masked computation output secret share to determine the first masked computation output; if the MAC of the masked computation output is verified, send the determined first masked computation output to the first evaluator node and the second evaluator node; receive information from one or both of the first evaluator node and the second evaluator node; and determine the output of the computation from the first masked computation output and the received information.

According to a ninth aspect, there is provided a computer program product comprising a computer readable medium having computer readable code embodied therein, the computer readable code being configured such that, on execution by a suitable computer or processor, the computer or processor is caused to perform any of the method aspects described above.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

As noted above, protocols for 1-out-of-3 multiparty computation (MPC) are considered (i.e. which are secure if one of three parties is corrupted) in which two parties (referred to herein as the "evaluators" or "evaluator nodes") carry out a two-party computation (2PC) among each other, possibly after the third party (referred to as a "dealer" or "first computing node" herein) has carried out preprocessing of data and provides the results to the evaluators, who have then verified that the received preprocessing information is correct. In such a system, the dealer/first node needs to obtain the output of the computation. The distribution of computation output between the three parties should satisfy the property of 'fairness', meaning that either all parties get the computation result, or none of them do (assuming that at most one of the three parties is actively corrupted). The techniques described herein relate to the distribution of the computation output in a way that satisfies the fairness property.

Figure 1:
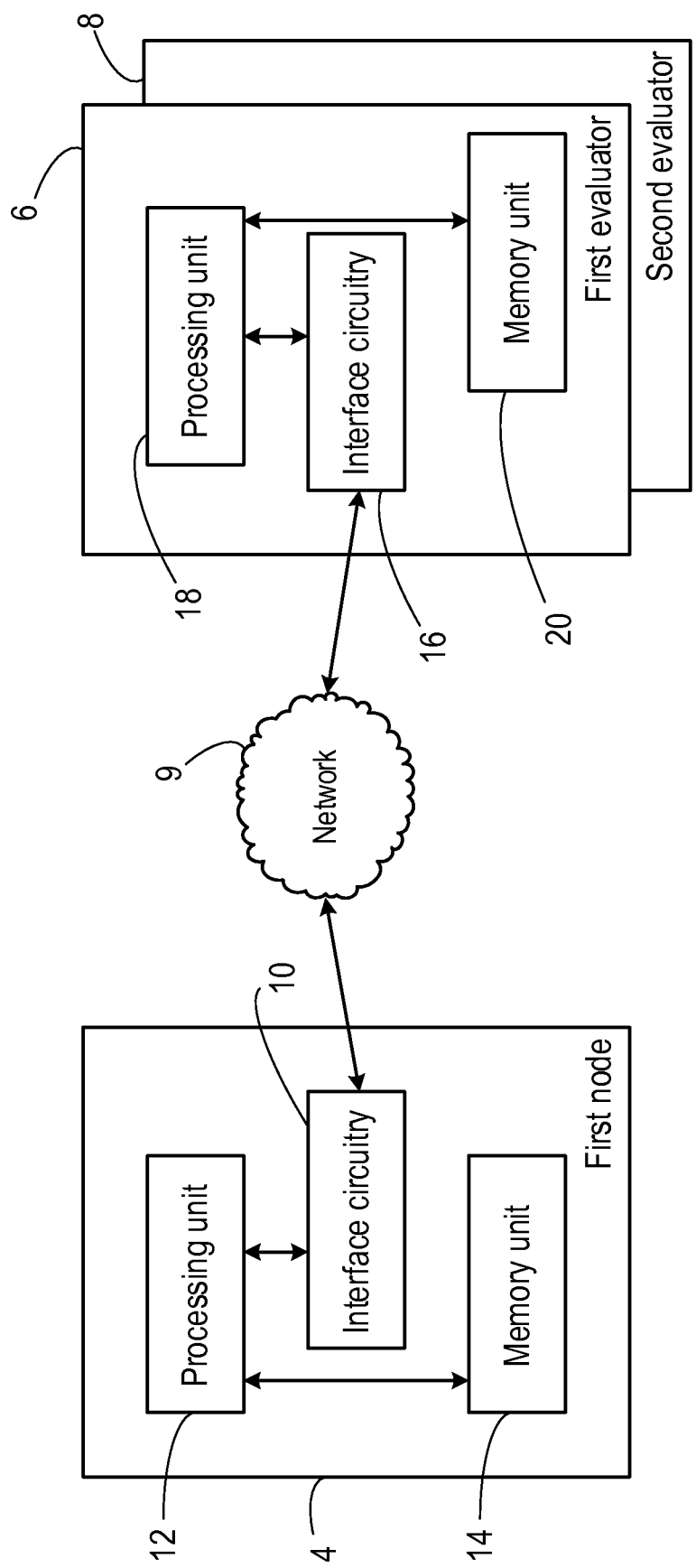
FIG. 1 is a block diagram of an exemplary system according to various embodiments.

FIG. 1 is a block diagram of a system 2 in which the techniques and principles described herein may be implemented. The system 2 comprises a first node 4 (which in some embodiments is also referred to herein as a "first computing node", "dealer" or "dealer node"), and two evaluator nodes (specifically a first evaluator node 6 and a second evaluator node 8), which are also referred to as "first evaluator" and "second evaluator".

The first node 4 and evaluators 6, 8 are interconnected via a network 9, such as the Internet, and thus may be located at respectively different locations. Of course, it will be appreciated that one or more of the evaluators 6, 8 may be local to the first node 4, or local to each other, and interconnected via a wired or wireless connection.

The first node 4, first evaluator 6 and second evaluator 8 can be any type of electronic device or computing device that can connect to network 9. For example each of the first node 4, first evaluator 6 and second evaluator 8 can be any of a computer (e.g. a server or desktop computer), a laptop, a tablet computer, a smart phone, etc.

The first node 4 includes interface circuitry 10 for enabling a data connection to other devices, such as the evaluators 6, 8. In particular the interface circuitry 10 can enable a connection between the first node 4 and the network 9, such as the Internet, via any desirable wired or wireless communication protocol. The first node 4 further includes a processing unit 12 for performing operations on data and for generally controlling the operation of the first node 4. The first node 4 further includes a memory unit 14 for storing any data required for the execution of the techniques described herein and for storing computer program code for causing the processing unit 12 to perform method steps as described in more detail below.

The processing unit 12 can be implemented in numerous ways, with software and/or hardware, to perform the various functions described herein. The processing unit 12 may comprise one or more microprocessors or digital signal processor (DSPs) that may be programmed using software or computer program code to perform the required functions and/or to control components of the processing unit 12 to effect the required functions. The processing unit 12 may be implemented as a combination of dedicated hardware to perform some functions (e.g. amplifiers, pre-amplifiers, analog-to-digital convertors (ADCs) and/or digital-to-analog convertors (DACs)) and a processor (e.g., one or more programmed microprocessors, controllers, DSPs and associated circuitry) to perform other functions. Examples of components that may be employed in various embodiments of the present disclosure include, but are not limited to, conventional microprocessors, DSPs, application specific integrated circuits (ASICs), and field-programmable gate arrays (FPGAs).

The memory unit 14 can comprise any type of non-transitory machine-readable medium, such as cache or system memory including volatile and non-volatile computer memory such as random access memory (RAM) static RAM (SRAM), dynamic RAM (DRAM), read-only memory (ROM), programmable ROM (PROM), erasable PROM (EPROM), and electrically erasable PROM (EEPROM).

FIG. 1 shows the exemplary components of the first evaluator 6, and it will be appreciated that the second evaluator 8 comprises similar components. Thus, the evaluator 6, 8 includes interface circuitry 16 for enabling a data connection to other devices, such as the first node 4 and the other evaluator 6, 8. In particular the interface circuitry 16 can enable a connection between the evaluator 6, 8 and the network 9, such as the Internet, via any desirable wired or wireless communication protocol. The evaluator 6, 8 further includes a processing unit 18 for performing operations on data and for generally controlling the operation of the evaluator 6, 8. The evaluator 6, 8 further includes a memory unit 20 for storing any data required for the execution of the techniques described herein and for storing computer program code for causing the processing unit 18 to perform method steps as described in more detail below.

The processing unit 18 and memory unit 20 can be implemented in numerous ways, similar to the processing unit 12 and memory unit 14 in the first node 4.

In the techniques described herein, it is assumed that after performing a multiparty computation the two evaluators 6, 8 have respective additive secret shares of the computation result z. The first evaluator 6 has a secret share denoted $[z]_1$, and the second evaluator 8 has a secret share denoted $[z]_2$. As used herein, $[\cdot]_1$ represents a secret share held by the first evaluator 6 of an element, and $[\cdot]_2$ represents a secret share held by the second evaluator 8 of an element.

Typically, the evaluators 6, 8 would exchange their shares of the output z and use a method prescribed by the 2PC protocol to verify the correctness of this output. For instance, in SPDZ-style protocols, at the end of the computation the two evaluators 6, 8 hold respective additive secret shares $[\alpha]_1$, $[\alpha]_2$ of a secret key (which can be a Message Authentication Code or "MAC" key, and for example an information-theoretic MAC) chosen by the dealer/first node 4; and $[\alpha z]_1$, $[\alpha z]_2$ of z respectively (which is an "information-theoretic MAC" on z using $\alpha$ as key). In this case, the evaluators 6, 8 would exchange their shares of z and run a MAC check procedure (for example as described in "Practical covertly secure MPC for dishonest majority—or: Breaking the SPDZ limits") to verify that the value z was correct.

However, embodiments of the techniques described herein blind the output z with a random mask s, and a correctness check on z+s is performed by a party that does not know s. If the check is successful then s is revealed.

Two variants of this concept are possible and are described herein. In a first variant, described below with reference to FIGS. 2 and 3, the evaluators 6, 8 set s and the first node/dealer 4 checks correctness. In a second variant, described below with reference to FIGS. 4 and 5, the first node/dealer 4 sets s and the evaluators 6, 8 check correctness.

First Variant

Firstly, a general description of the operations in the first variant is provided. This variant operates in the setting where the dealer has distributed preprocessing information for an execution of the SPDZ protocol between the two evaluators, as described above. In particular, as a result of this preprocessing, the dealer knows the SPDZ MAC key $\alpha$ of which the two evaluators each have respective additive secret shares $[\alpha]_i$. In this variant, the evaluators 6, 8 agree on a random mask s (for example one evaluator determines s and sends it to the other evaluator 6, 8) and each sends a respective secret share $[z+s]_i$ and $[\alpha \cdot (z+s)]_i$ of the masked output z+s and its MAC ($\alpha \cdot (z+s)$) to the dealer 4. It should be noted that, to eliminate the possibility that a particular way in which the values z+s and $\alpha \cdot (z+s)$ are secret shared between the evaluators 6, 8 leaks information to the dealer 4, the evaluators 6, 8 may re-randomise their shares prior to sending them to the dealer 4, for instance by the first evaluator 6 adding a random value to its secret share and the second evaluator 8 removing (subtracting) the same random value from its secret share.

The dealer 4 verifies the MAC on z+s based on its knowledge of $\alpha$. If the MAC is not correct, the protocol terminates without giving any output.

The dealer 4 determines z+s from the received secret shares and sends z+s to the evaluators 6, 8 in such a way that all three parties agree on which value was sent; for instance, using a protocol for broadcast such as the Dolev-Strong protocol ("Authenticated Algorithms for Byzantine Agreement" by D. Dolev and H. R. Strong, *SIAM J. Comput.*, 12(4), 656-666).

The evaluators 6, 8 determine z from z+s, and the evaluators 6, 8 send s to the dealer 4.

The evaluators 6, 8 exchange their respective shares $[z]_i$ and determine z, and they each check if this z matches the value z':=(z+s)−s, based on the z+s received from the dealer 4. If this z does match z', the evaluators 6, 8 accept z=z' as the computation result. If this z does not match z', then the evaluators 6, 8 perform a MAC check on z. If the MAC check is successful then the evaluators 6, 8 accept z as the computation result, and if the MAC check is unsuccessful, the evaluators 6, 8 accept z' as the computation result.

In the above method, it is not specified how the evaluators 6, 8 can 'provide s' to the dealer 4 after determining z from z+s. If the evaluators 6, 8 both just send s to the dealer 4, the dealer 4 would not know which one was correct. Two possibilities for addressing this problem are set out below.

In a first possibility, the evaluators 6, 8 both commit to s using the same commitment function and, if this is a randomised function, using the same randomness; provide the commitments to s to the dealer 4; and the dealer 4 terminates the computation output distribution procedure without providing z+s if the two commitments do not match. Otherwise, the dealer 4 accepts whichever received value of s matches the received commitment, in the sense that re-computing it gives the same value that was received before. If the commitment is a randomised function, the evaluators both provide to the dealer along with s the randomness used to determine the commitment.

In a second possibility, the dealer 4 provides secret values $\beta$, $\gamma$ as inputs of the multi-party computation to the evaluators 6, 8. The evaluators 6, 8 compute $\beta s + \gamma$ as part of the computation and both evaluators 6, 8 send s and $\beta s + \gamma$ to the dealer 4. The dealer 4 accepts the correctly formed s.

A detailed embodiment of the first variant is now provided in notation form, which uses a commitment-based technique to provide s. In the following, Comm(m; r) is any commitment to message m with randomness r, e.g., a Pedersen commitment or a cryptographic hash applied to the concatenation of the message and randomness. In the following notation, the first evaluator 6 and the second evaluator 8 are denoted $\mathcal{P}_1$ and $\mathcal{P}_2$ respectively, and the dealer node 4 is denoted $\mathcal{P}_3$. The notation $\mathcal{P}_x \rightarrow \mathcal{P}_y$ refers to the sending of some information from node $\mathcal{P}_x$ to node $\mathcal{P}_y$, and the notation $\mathcal{P}_x \rightarrow \mathcal{P}_{y,z}$ refers to the sending of some information from node $\mathcal{P}_x$ to node $\mathcal{P}_y$ and node $\mathcal{P}_z$. The notation $\mathcal{P}_{x,y} \rightarrow \mathcal{P}_z$ refers to the sending of the same information to node $\mathcal{P}_x$ from both node $\mathcal{P}_x$ and node $\mathcal{P}_y$. $r_1$ and $r_2$ are the random values used to re-randomize the secret shares of z+s and a·(z+s) respectively.

Figure 2:
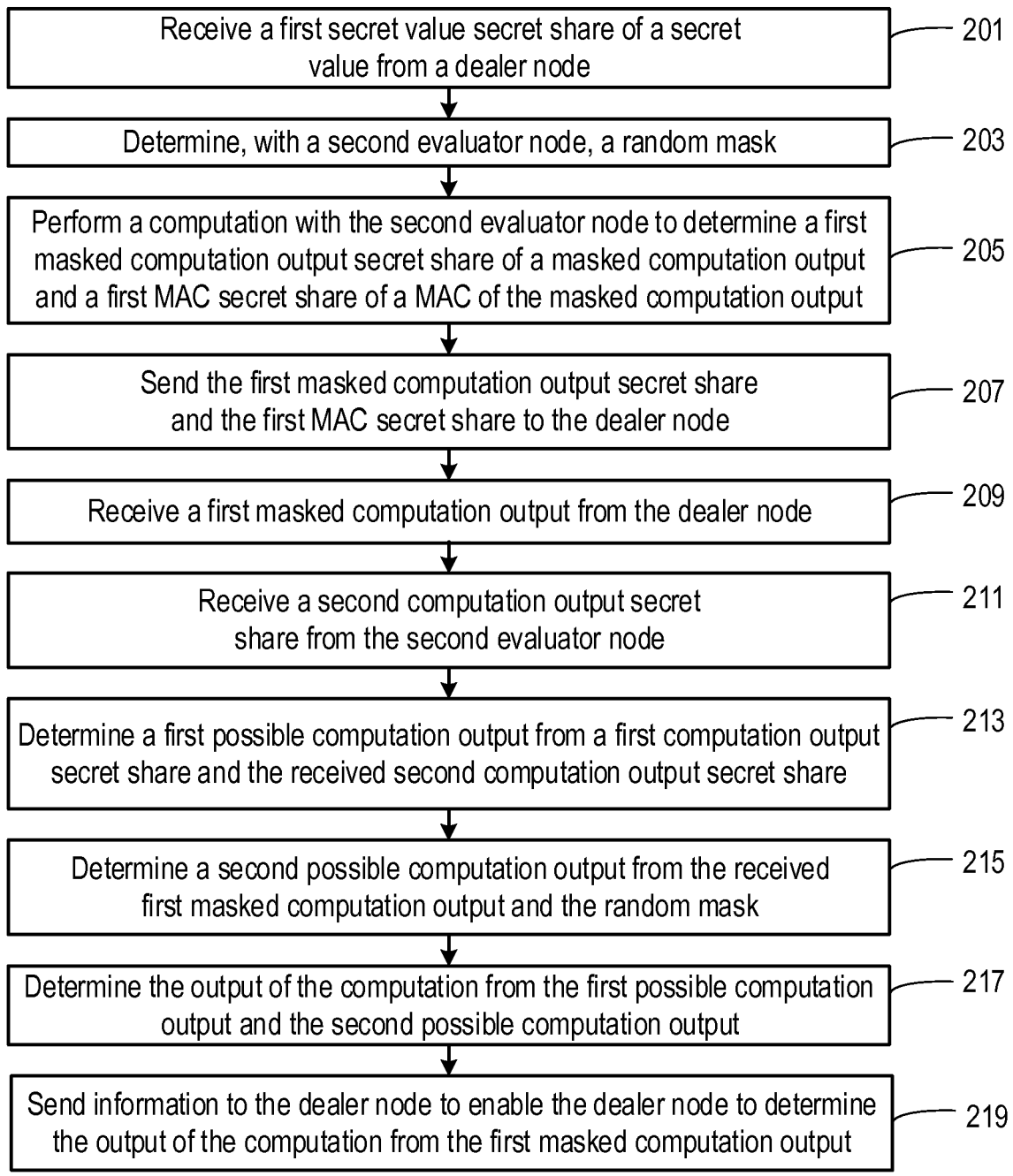
FIG. 2 is a flow chart illustrating an exemplary method of operating an evaluator node according to a first set of embodiments.
Figure 3:
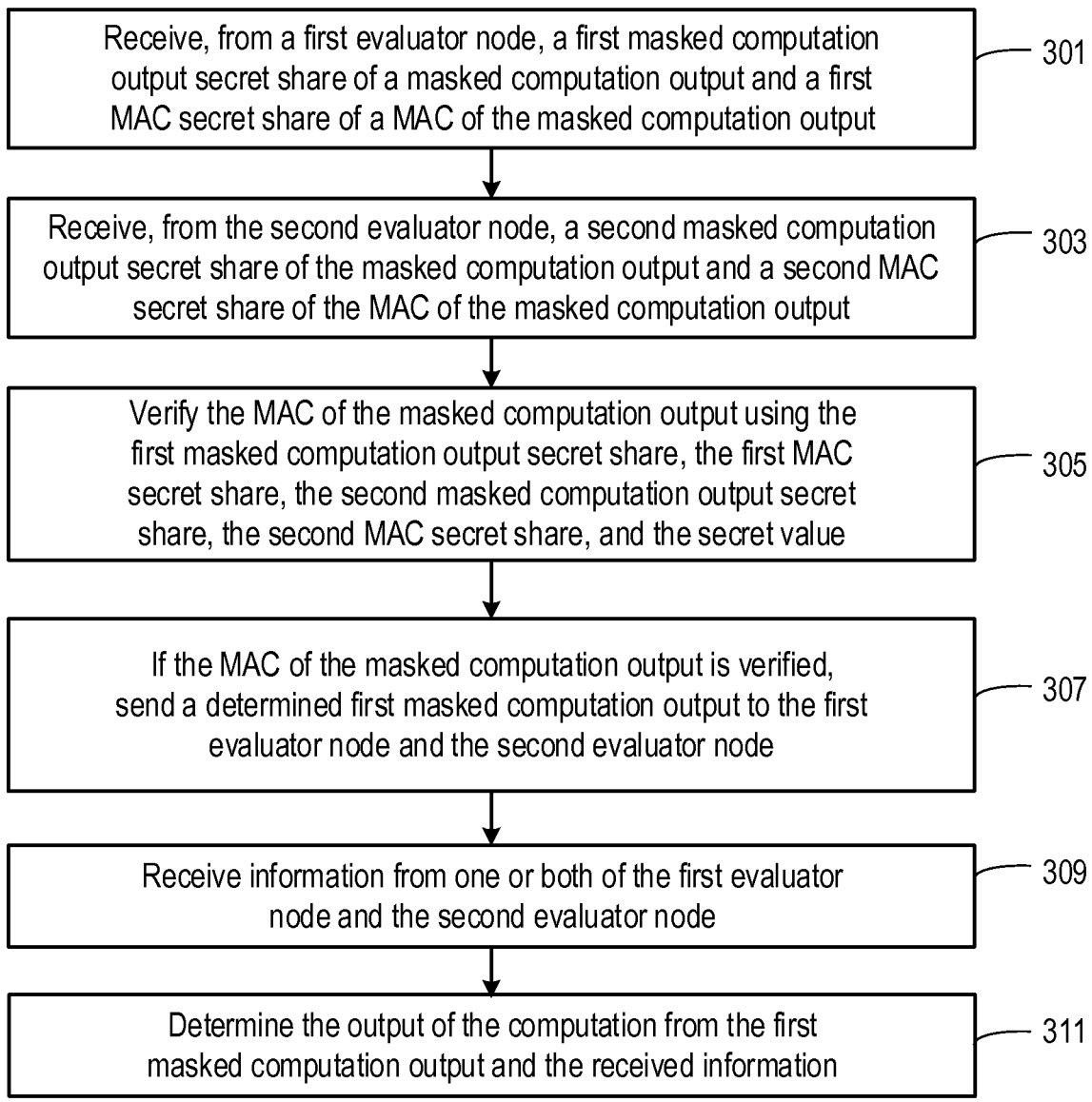
FIG. 3 is a flow chart illustrating an exemplary method of operating a dealer node according to the first set of embodiments.

$\mathcal{P}_1 \to \mathcal{P}_2$: s, $r_1$, $r_2$, $r_3$ (chosen randomly)
$\mathcal{P}_1 \to \mathcal{P}_3$: $[z]_1+s+r_1$, $[\alpha z]_1+[\alpha]_1 \cdot s+r_2$, Comm(s; $r_3$)
$\mathcal{P}_2 \to \mathcal{P}_3$: $[z]_2-r_1$, $[\alpha z]_2+[\alpha]_2 \cdot s-r_2$, Comm(s; $r_3$)
$\mathcal{P}_3$: if MAC wrong or commitments differ: send "fail" and terminate
$\mathcal{P}_3 \to \mathcal{P}_{1,2}$: Z:=$([z]_1+s+r_1)+([z]_2-r_1)$
(such that all parties agree on the value sent)
$\mathcal{P}_{1,2} \to \mathcal{P}_3$: s, $r_3$
$\mathcal{P}_3$: accepts Z-s for s, $r_3$ matching the commitment
$\mathcal{P}_1 \to \mathcal{P}_2$: $[z]_1$
$\mathcal{P}_2 \to \mathcal{P}_1$: $[z]_2$
: next rounds
$\mathcal{P}_1$, $\mathcal{P}_2$: if Z-s=$[z]_1+[z]_2$, accept result
$\mathcal{P}_1$, $\mathcal{P}_2$: if Z-s $\neq [z]_1+[z]_2$: if the MAC check on $[z]_1+[z]_2$ succeeds: accept $[z]_1$ +$[z]_2$, else accept Z-s The first variant is now described with reference to the flow charts in FIGS. 2 and 3. FIG. 2 is a flow chart illustrating a method of operating an evaluator node 6, 8 to distribute a computation output, and FIG. 3 is a flow chart illustrating a corresponding method of operating a dealer node 4 to distribute the computation output. Although the method in FIG. 2 is described from the point of view of the first evaluator node 6, it will be appreciated that both of the first evaluator node 6 and the second evaluator node 8 operate according to the method shown in FIG. 2. It will also be appreciated that the order of the steps presented in FIGS. 2 and 3 is merely exemplary and it may be possible for the order of one or more of the illustrated steps to be changed or altered from that shown.

The method steps in the flow chart of FIG. 2 can be performed by the processing unit 18 and interface circuitry 16 in the evaluator node 6, 8. In some embodiments, computer program code can be provided that causes the processing unit 18 and/or interface circuitry 16 to operate according to the method shown in FIG. 2. Likewise, the method steps in the flow chart of FIG. 3 can be performed by the processing unit 12 and interface circuitry 10 in the dealer node 4. In some embodiments, computer program code can be provided that causes the processing unit 12 and/or interface circuitry 10 to operate according to the method shown in FIG. 3.

In the first step of FIG. 2, step 201, the first evaluator node 6 receives a first secret value secret share of a secret value from the dealer node 4. This can be received via the interface circuitry 16. The secret value may be a MAC key, α, and thus the first evaluator node 6 can receive a secret share of the MAC key, $[\alpha]_1$. The second evaluator node 8 will receive a respective secret share of the secret value ($[\alpha]_1$). The MAC key can be a "one-time MAC" which is a variant of a MAC that can only be used once, or it can be a regular MAC key. Alternatively the secret value may be a digital signature key, and thus the first evaluator node 6 can receive a secret share of the digital signature key.

Although not shown in FIG. 3, the method of operating the dealer node 4 can include providing respective secret value secret shares of a secret value to each of the first evaluator node 6 and the second evaluator node 8.

In the next step of FIG. 2, step 203, the first evaluator node 6 determines a random mask s with the second evaluator node 8. This step can comprise the first evaluator node 6 generating the random mask s and sending it to the second evaluator node 8 so that both evaluator nodes 6, 8 know the random mask s, or this step can comprise the first evaluator node 6 receiving the random mask s from the second evaluator node 8 (after the second evaluator node 8 has generated the random mask s).

In step 205 of FIG. 2, the first evaluator node 6 performs a computation with the second evaluator node 8. This computation is a multiparty computation (MPC). Performing the computation results in the first evaluator node 6 determining a secret share of the computation output, a secret share of a masked computation output and a secret share of a MAC of the masked computation output.

As the computation is an MPC, each of the first evaluator node 6 and the second evaluator node 8 therefore have a respective secret share of the computation output, and neither the first evaluator node 6 or the second evaluator node 8 individually know the actual computation output. The secret share of the computation output determined by the first evaluator node 6 is referred to herein as the "first computation output secret share" and the secret share of the computation output determined by the second evaluator node 8 is referred to herein as the "second computation output secret share".

As noted above, performing the computation determines the computation output masked using the random mask, and thus the masked computation output is a function of an output of the computation and the random mask. In some embodiments, the masked computation output is a sum of the computation output and the random mask. As the computation is an MPC, each of the first evaluator node 6 and the second evaluator node 8 therefore have a respective secret share of the masked computation output, and neither the first evaluator node 6 nor the second evaluator node 8 individually know the masked computation output. The secret share of the masked computation output determined by the first evaluator node 6 is referred to herein as the "first masked computation output secret share" and the secret share of the masked computation output determined by the second evaluator node 8 is referred to herein as the "second masked computation output secret share".

As noted above, performing the computation also determines a MAC of the masked computation output. Thus, the computation provides a MAC, determined as a function of the secret value received in step 201 and the masked computation output, and each of the first evaluator node 6 and the second evaluator node 8 has a respective secret share of the MAC. Thus, neither the first evaluator node 6 nor the second evaluator node 8 individually know the MAC. In some embodiments, the MAC of the masked computation output is a product of the masked computation output and the secret value. The secret share of the MAC of the masked computation output determined by the first evaluator node 6 is referred to herein as the "first MAC secret share" and the secret share of the MAC of the masked computation output determined by the second evaluator node 8 is referred to herein as the "second MAC secret share".

Next, in step 207, the first evaluator node 6 sends the first masked computation output secret share and the first MAC secret share to the dealer node 4.

Step 301 in FIG. 3 shows the dealer node 4 receiving the first masked computation output secret share and the first MAC secret share from the first evaluator node 6.

The second evaluator node 8 likewise sends the second masked computation output secret share and the second MAC secret share to the dealer node 4, and step 303 in FIG. 3 shows the dealer node 4 receiving the second masked computation output secret share and the second MAC secret share from the second evaluator node 8.

Next, in step 305 of FIG. 3, the dealer node 4 verifies the MAC of the masked computation output using the information received in steps 301 and 303. That is, the dealer node 4 reconstructs the MAC of the masked computation output from the first MAC secret share and the second MAC secret share, and verifies that the reconstructed MAC is correct using the secret value that was provided (as respective secret shares) to the first evaluator node 6 and second evaluator node 8, the first masked computation output secret share and the second masked computation output secret share. In verifying the MAC of the masked computation output, the dealer node 4 combines the first masked computation output secret share and the second masked computation output secret share to determine a masked computation output. This masked computation output, i.e. that formed in step 305 by the dealer node 4 from the received first masked computation output secret share and the received second masked computation output secret share, is referred to as the "first masked computation output" herein.

In some embodiments, if the MAC is not verified then the method can be terminated after step 305.

Otherwise, if in step 305 the MAC of the masked computation output is verified, then in step 307 the dealer node 4 sends the first masked computation output to the first evaluator node 6 and the second evaluator node 8. The first masked computation output is preferably broadcast from the dealer node 4 so that the first evaluator node 6 and the second evaluator node 8 know that each has received the same first masked computation output. This broadcast can be over a broadcast channel or using the Dolev-Strong protocol for performing broadcast between pairwise connected nodes.

Step 209 of FIG. 2 shows the first evaluator node 6 receiving the first masked computation output from the dealer node 4. In some embodiments, if the first evaluator node 6 detects that the dealer node 4 has sent a different value of the first masked computation output to the second evaluator node 8, then the first evaluator node 6 can terminate the method and not perform any subsequent steps.

In step 211, the first evaluator node 6 receives a second computation output secret share from the second evaluator node 8. Although not shown in FIG. 2, in some embodiments, the first evaluator node 6 can send the first computation output secret share to the second evaluator node 8.

In step 213 the first evaluator node 6 determines a first possible computation output from the first computation output secret share and the received second computation output secret share. That is, the first evaluator node 6 combines the first computation output secret share and the second computation output secret share to determine a computation output. As it is not known at this stage whether this computation output is correct, this computation output is referred to as a "first possible computation output".

In step 215, the first evaluator node 6 determines a second possible computation output from the first masked computation output received in step 209 and the random mask determined in step 203. That is, the random mask can be used to 'remove' the random mask from the first masked computation output to reveal the computation output. As it is not known at this stage whether this computation output is correct, this computation output is referred to as a "second possible computation output".

In step 217, the first evaluator node 6 determines the output of the computation from the first possible computation output and the second possible computation output.

In some embodiments, in step 217 the output of the computation from the first possible computation output and the second possible computation output is determined by comparing the first possible computation output to the second possible computation output and determining the computation the output of the computation based on the comparison.

If the first evaluator node 6 and second evaluator node 8 have performed the computation correctly, and the dealer node 4, first evaluator node 6 and the second evaluator node 8 have honestly communicated the various pieces of information mentioned above, then the first possible computation output should be the same as the second possible computation output, and thus either output can be used as the computation output if the first possible computation output matches the second possible computation output.

However, if the first possible computation output does not match the second possible computation output, then step 217 can further comprise performing a MAC check on the first possible computation output, and the output of the computation can be determined as the first possible computation output if the MAC check is passed, and the output of the computation can be determined as the second possible computation output if the MAC check is failed.

The MAC check on the first possible computation output can be the SPDZ MAC check, e.g., as described in the paper: "Practical Covertly Secure MPC for Dishonest Majority—or: Breaking the SPDZ Limits". More generally, at this stage of the method, the first evaluator node 6 knows the first computation output secret share ($[z]_1$), the second computation output secret share ($[z]_2$), the first masked computation output secret share ($[\alpha z]_1$) and the first secret value secret share $[\alpha]_1$, and the second evaluator node 8 likewise knows the first computation output secret share ($[z]_1$), the second computation output secret share ($[z]_2$), the second masked computation output secret share ($[\alpha z]_2$) and the second secret value secret share $[\alpha]_2$, and together the first evaluator node 6 and the second evaluator node 8 determine (using some distributed protocol) whether the following is true:

$$([z]_1+[z]_2)*([\alpha]_1+[\alpha]_2)=([\alpha z]_1+[\alpha z]_2)$$

Finally, in step 219, the first evaluator node 6 sends information to the dealer node 4 to enable the dealer node 4 to determine the output of the computation from the first masked computation output. In some embodiments, this information is the random mask s, which was determined in step 203. In other embodiments, the first evaluator node 6 can send the first possible computation output determined in step 213 to the dealer node 4.

In some further embodiments, where the information sent in step 219 is the random mask, the method in the first evaluator node 6 can further include determining a commitment to the random mask, and sending the commitment to the dealer node 4. In some embodiments, the commitment is a cryptographic hash of the random mask, and in other embodiments the commitment is a function of the random mask and a random number (e.g. $r_3$ in the above notation-based description of the first variant). This commitment to the random mask can be sent to the dealer node 4 at an early stage of the method (e.g. along with the other information sent in step 207).

In some further embodiments, as part of the computation, the first evaluator node 6 and second evaluator node 8 determine the result of a function of one or more parameters and the random mask s, for example a first parameter β and a second parameter γ, and send the result of the function of the one or more parameters and the random mask to the dealer node 4. The one or more parameters are provided as private inputs to the computation by the dealer node 4. The function of the one or more parameters and the random mask s is generally a MAC, for example an unconditionally secure MAC, e.g. $m=\beta x+\gamma$, where x is the input string.

Returning to FIG. 3, the dealer node 4 receives information from one or both of the first evaluator node 6 and the second evaluator node 8 in step 309 (this is the information that was sent in step 219 of FIG. 2), and uses this information in step 311 to determine the output of the computation from the first masked computation output derived in step 307 and the received information. As noted above, the received information may be the random mask, and thus step 311 can comprise using the received random mask to 'remove' the random mask from the first masked computation output to reveal the computation output.

In some embodiments, as noted above, the dealer node 4 can also receive a commitment to the random mask from the first evaluator node 6 (referred to as the "first commitment", and a commitment to the random mask from the second evaluator node 8 (referred to as the "second commitment"). The dealer node 4 then compares the first commitment and the second commitment. If the commitments do not match, then the dealer node 4 can terminate the method, and otherwise, i.e. if the commitments do match, the dealer node 4 can proceed with the method described above. Furthermore, where the information received in step 311 is the random mask, and the random mask is received from each of the first evaluator node 6 and the second evaluator node 8, the dealer node 4 can determine which of the received random masks match the respective received commitment, and the dealer node 4 can use a received random mask that matches the respective received commitment in performing step 311.

In some embodiments, as noted above, the dealer node 4 can provide one or more parameters, e.g. a first parameter $\beta$ and a second parameter $\gamma$, as private inputs to the computation performed by the first evaluator node 6 and the second evaluator node 8, and receive a result of a function of the first parameter, the second parameter and the information received from the first evaluator node 6 and the second evaluator node 8. The dealer node 4 can then determine from the received results which received information is correct, and use the correct received information in step 311 to determine the computation output.

Second Variant

Firstly, a general description of the operations in the second variant is provided. In this second variant, the evaluator nodes 6, 8 check correctness. This variant works in combination with any multi-party computation protocol between the two evaluator nodes to which a first computing node 4 can provide inputs, e.g., as discussed in "A framework for outsourcing of secure computation". In particular, it can be applied in the setting where the first computing node 4 provides preprocessing information to a 2PC SPDZ protocol instance between the two evaluator nodes 6, 8, or in the setting where the two evaluator nodes 6, 8 execute a SPDZ protocol instance based on preprocessing information they have generated among each other.

The first computing node 4 provides parameter s (the random mask) as additional input to the computation by the evaluators 6, 8.

The evaluators 6, 8 compute and open z+s and using the MPC protocol, checking correctness in the way specified by the MPC protocol, which may involve terminating in case of failure.

The evaluators 6, 8 provide z+s to the first computing node 4 by both sending the value in such a way that all parties agree on which two values for z+s were sent; for instance, using a protocol for broadcast such as the Dolev-Strong protocol ("Authenticated Algorithms for Byzantine Agreement"). All parties terminate if the two evaluator nodes 6, 8 did not send the same value for z+s. Otherwise, the first computing node 4 accepts z computed from the value z+s received from both evaluator nodes 6, 8 and the random mask.

The first computing node 4 sends z to the evaluator nodes 6, 8, and the evaluator nodes 6, 8 check this value against z' obtained by exchanging their shares $[z]_i$. In case of a mismatch, the evaluator nodes 6, 8 compute and open z using the MPC protocol used above, accepting the resulting value z'' if this succeeds and otherwise accepting the value z sent by the first computing node 4. In particular, for the SPDZ protocol, computing and opening z involves performing a MAC check on z' and success means that the MAC check is passed.

A detailed embodiment of the second variant is now provided in notation form. In the following notation, the first evaluator 6 and the second evaluator 8 are denoted $\mathcal{P}_1$ and $\mathcal{P}_2$ respectively, and the first computing node 4 is denoted $\mathcal{P}_3$. The notation $\mathcal{P}_x \rightarrow \mathcal{P}_y$ refers to the sending of some information from node $\mathcal{P}_x$ to node $\mathcal{P}_y$, and the notation $\mathcal{P}_x \rightarrow \mathcal{P}_{y,z}$ refers to the sending of some information from node $\mathcal{P}_x$ to node $\mathcal{P}_y$ and node $\mathcal{P}_z$. $\mathcal{P}_{1,2}$ or $\mathcal{P}_{1,2,3}$ denotes each of the indicated parties performing the indicated action.

$\mathcal{P}_3 \rightarrow \mathcal{P}_{1,2}$: input s as sensitive/private input to the 2PC
$\mathcal{P}_{1,2}$: compute z+s with MPC; terminate if fail
$\mathcal{P}_1 \rightarrow \mathcal{P}_{2,3}$: $z_1:=z+s$ (such that all parties agree on which value was sent)
$\mathcal{P}_2 \rightarrow \mathcal{P}_{1,3}$: $z_2:=z+s$ (such that all parties agree on which value was sent)
$\mathcal{P}_{1,2,3}$: terminate if $z_1 \neq z_2$
$\mathcal{P}_3 \rightarrow \mathcal{P}_{1,2}$ $z:=z_1-S$
$\mathcal{P}_1 \rightarrow \mathcal{P}_2$: $[z]_1$
$\mathcal{P}_2 \rightarrow \mathcal{P}_1$: $[z]_2$
$\mathcal{P}_{1,2}$: $[z]_1+[z]_2$ matches z: accept result
$\mathcal{P}_{1,2}$: mismatch: open and check z using MPC protocol; return opened value if succeeds; otherwise return z received from $\mathcal{P}_3$.

Figure 4:
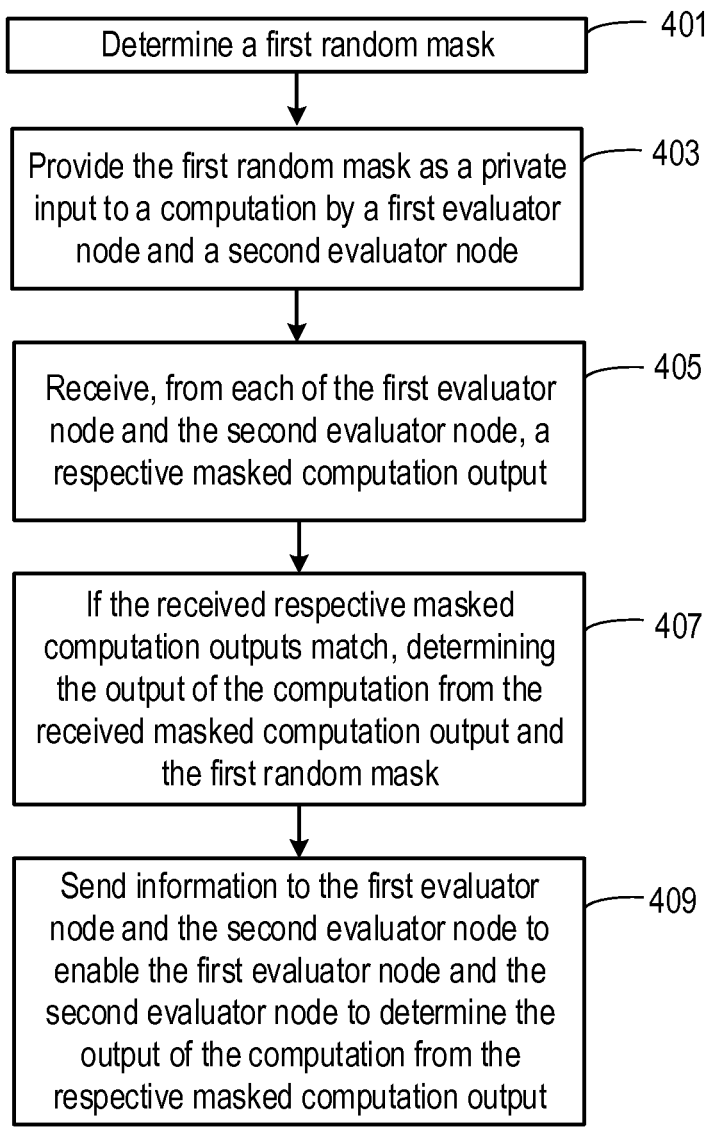
FIG. 4 is a flow chart illustrating an exemplary method of operating a first computing node according to a second set of embodiments.
Figure 5:
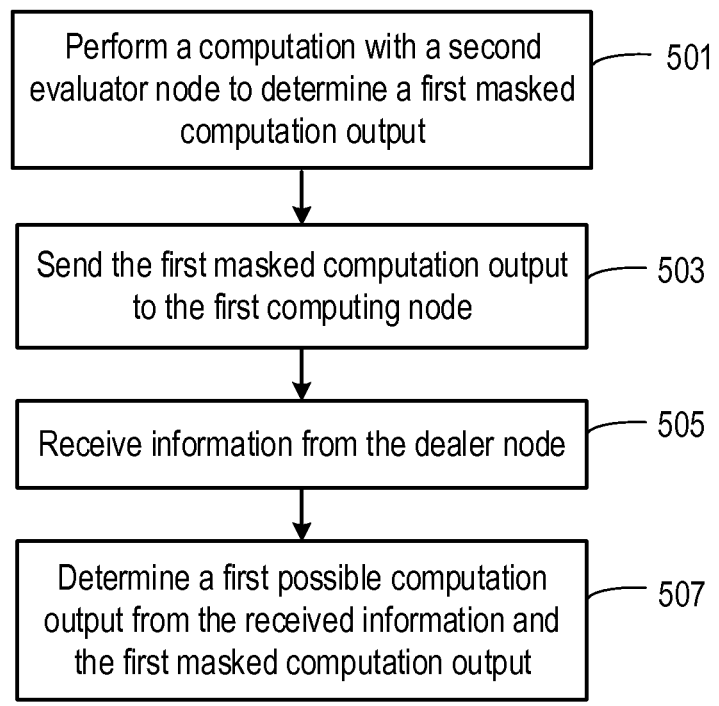
FIG. 5 is a flow chart illustrating an exemplary method of operating an evaluator node according to the second set of embodiments.

The second set of embodiments is now described with reference to the flow charts in FIGS. 4 and 5. FIG. 4 is a flow chart illustrating a method of operating a first computing node 4 to distribute a computation output, and FIG. 5 is a flow chart illustrating a method of operating an evaluator node 6, 8 to distribute the computation output. Although the method in FIG. 5 is described from the point of view of the first evaluator node 6, it will be appreciated that both of the first evaluator node 6 and the second evaluator node 8 operate according to the method shown in FIG. 5. It will also be appreciated that the order of the steps presented in FIGS. 4 and 5 is merely exemplary and it may be possible for the order of one or more of the illustrated steps to be changed or altered from that shown.

The method steps in the flow chart of FIG. 4 can be performed by the processing unit 12 and interface circuitry 10 in the first computing node 4. In some embodiments, computer program code can be provided that causes the processing unit 12 and/or interface circuitry 10 to operate according to the method shown in FIG. 4. Likewise, the method steps in the flow chart of FIG. 5 can be performed by the processing unit 18 and interface circuitry 16 in the first evaluator node 6 and the second evaluator node 8. In some embodiments, computer program code can be provided that causes the processing unit 18 and/or interface circuitry 16 to operate according to the method shown in FIG. 5.

In the first step of FIG. 4, step 401, the first computing node 4 determines a random mask s. This random mask is referred to as the "first random mask". The first computing node 4 then provides the first random mask as a private input to a computation by the first evaluator node 6 and the second evaluator node 8 (step 403).

In step 501 of FIG. 5, the first evaluator node 6 performs a computation with the second evaluator node 8. This computation is a multiparty computation (MPC). Performing the computation results in the first evaluator node 6 (and the second evaluator node 8) determining a masked computation output.

Each of the first evaluator node 6 and the second evaluator node 8 also have a respective secret share of the computation output, and thus neither the first evaluator node 6 nor the second evaluator node 8 individually know the actual computation output. The secret share of the computation output determined by the first evaluator node 6 is referred to herein as the "first computation output secret share" and the secret share of the computation output determined by the second evaluator node 8 is referred to herein as the "second computation output secret share".

The masked computation output is the computation output masked using the first random mask input to the computation by the first computing node 4, and thus the masked computation output is a function of an output of the computation and the first random mask. In some embodiments, the masked computation output is a sum of the computation output and the first random mask. The masked computation output determined by the first evaluator node 6 is referred to herein as the "first masked computation output" and the masked computation output determined by the second evaluator node 8 is referred to herein as the "second masked computation output".

The first evaluator node 6 then sends the first masked computation output to the first computing node 4 (step 503 of FIG. 5). The second evaluator node 8 also sends the second masked computation output to the first computing node 4.

In some embodiments, in step 503 the first evaluator node 6 broadcasts the first masked computation output to the first computing node 4. The broadcast can be over a broadcast channel or using the Dolev-Strong protocol for performing broadcast between pairwise connected nodes. In this way the second evaluator node 8 can also receive the first masked computation output, and broadcasting means that the first computing node 4 and second evaluator node 8 know that each have received the same masked computation output. In a similar way, the second evaluator node 8 can also broadcast the second masked computation output to the first computing node 4, and the first evaluator node 6 can also receive the second masked computation output.

Thus, in step 405 of FIG. 4, the first computing node 4 receives a respective masked computation output from each of the first evaluator node 6 and the second evaluator node 8.

The first computing node 4 then determines whether the received first masked computation output matches the received second masked computation output, and if they match, the first computing node 4 determines the output of the computation from either of the received masked computation outputs and the first random mask (step 407 of FIG. 4). For example, the first random mask can be 'removed' (e.g. subtracted) from the first masked computation output to reveal the computation output. If the received respective masked computation outputs do not match, then the method can be terminated before step 407.

Next, in step 409 of FIG. 4, the first computing node 4 sends information to the first evaluator node 6 and the second evaluator node 8 to enable the first evaluator node 6 and the second evaluator node 8 to determine the output of the computation from the respective masked computation output. In some embodiments, this information is the first random mask s, which was determined in step 401. In other embodiments, this information can be the computation output determined in step 407.

This information is received by the first evaluator node 6 in step 505 of FIG. 5. Next, in step 507, the first evaluator node 6 determines a first possible computation output from the received information and the first masked computation output determined in step 501.

Two ways in which the actual computation output can be determined by the first evaluator node 6 are set out below.

In a first approach, the first evaluator node 6 and the second evaluator node 8 determine a second possible computation output, and the computation output is determined from the first possible computation output and the second possible computation output.

The second possible computation output can be determined from the first computation output secret share and the second computation output secret share (that is sent by the second evaluator node 8 to the first evaluator node 6). The first evaluator node 6 can also send the first computation output secret share to the second evaluator node 8.

The computation output can be determined by comparing the first possible computation output to the second possible computation output. If the first possible computation output and the second possible computation output match, then either can be used as the computation output.

If the first possible computation output does not match the second possible computation output, then the first evaluator node 6 can check, together with the second evaluator node 8, whether the second possible computation output is correct, and if the second possible computation output is correct the second possible computation output is used as the computation output. If it is determined that the second possible computation output is not correct, then the first possible computation output can be used as the computation output.

The check of the correctness of the second possible computation output can include performing a MAC check on the second possible computation output and a MAC of the second possible computation output.

The second approach to determining the computation output is set out below. This approach may, depending on the performance of the various underlying primitives used, be more efficient than the above approach.

Here, the first computing node 4 provides a second random mask as a private input to the computation performed in step 501. The first evaluator node 6 and the second evaluator node 8 determine a MAC key. This step can comprise the first evaluator node 6 generating the MAC key and sending it to the second evaluator node 8 so that both evaluator nodes 6, 8 know the MAC key, or this step can comprise the first evaluator node 6 receiving the MAC key from the second evaluator node 8 (after the second evaluator node 8 has generated the MAC key).

Then, in step 501, in addition to determining the first computation output secret share and the first masked computation output as described above in the computation, the first evaluator node 6 determines a masked MAC of the computation output. The masked MAC of the computation output is a function of a MAC of the computation output determined using the MAC key, and the second random mask.

The first evaluator node 6 sends the masked MAC of the computation output to the first computing node 4. The second evaluator node 8 also determines a masked MAC of the computation as part of the computation, and the second evaluator node 8 sends this masked MAC to the first computing node 4.

The first computing node 4 compares the received masked MACs, and if they do not match then the first computing node 4 terminates the method before step 409. If the masked MACs of the computation output do match, then the first computing node 4 sends information (referred to as "second information") to the first evaluator node 6 and the second evaluator node 8 to enable the first evaluator node 6 and second evaluator node 8 to determine the MAC of the computation output from the respective masked MACs of the computation output. This second information can be the second random mask.

After receiving the second information from the first computing node 4, the first evaluator node 6 determines the MAC of the computation output from the second information and the masked MAC of the computation output. For example, where the second information is the second random mask, the second random mask can be subtracted from the masked MAC. If the MAC of the computation output matches the MAC of the first possible computation output determined by the first evaluator node 6 using the MAC key, then the first possible computation output is used as the computation output.

If the MAC of the computation output does not match the MAC of the first possible computation output, then the first evaluator node 6 receives the second computation output secret share from the second evaluator node 8, and the first evaluator node 6 determines the computation output from the first computation output secret share and the second computation output secret share (i.e. by reconstructing the computation output from the two secret shares). To enable the second evaluator node 8 to also determine the computation output, the first evaluator node 6 can send the first computation output secret share to the second evaluator node 8.

In some embodiments, the MAC key comprises a first field element and a second field element, and the MAC of the output of the computation is a sum of the first field element and a product of the output of the computation and the second field element.

In any of the above embodiments, where the first evaluator node 6 can also receive the second masked computation output from the second evaluator node 8 (for example if the second evaluator node 8 broadcasts the second masked computation output), the first evaluator node 6 can compare the second masked computation output to the first masked computation output, and terminate the method before step 507 if the received first masked computation output does not match the second masked computation output.

The techniques described herein can be applied in any setting that requires arithmetic-circuit multiparty computation between three parties or multiparty computation in the outsourcing setting (e.g. where many inputters/outputters outsource the work to a small number of evaluators). Whenever, at the end of a three-party computation, a result shared between two parties needs to be fairly distributed between all three parties, it is highly desirable to apply a technique as described herein to achieve fairness.

There is therefore provided techniques that improve the distribution of a computation output between three parties that guarantee fairness.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The following numbered paragraphs set out various statements relating to a dealer node 4, an evaluator node 6, 8 and methods of operating the same according to the first variant described above:

1. A computer-implemented method of operating a first evaluator node to distribute a computation output, the method comprising:
   receiving a first secret value secret share of a secret value from a dealer node;
   determining, with a second evaluator node, a random mask;
   performing a computation with the second evaluator node to determine:
   (i) a first masked computation output secret share of a masked computation output, wherein the masked computation output is a function of an output of the computation and the random mask; and
   (ii) a first Message Authentication Code, MAC, secret share of a MAC of the masked computation output, wherein the MAC of the masked computation output is a function of the masked computation output and the secret value;
   sending the first masked computation output secret share and the first MAC secret share to the dealer node;
   receiving a first masked computation output from the dealer node;
   receiving a second computation output secret share from the second evaluator node, wherein the second computation output secret share is a secret share, determined by the second evaluator node, of the output of the computation;
   determining a first possible computation output from a first computation output secret share and the received second computation output secret share, wherein the first computation output secret share is a secret share, determined by the first evaluator node when performing the computation, of the output of the computation;
   determining a second possible computation output from the received first masked computation output and the random mask;
   determining the output of the computation from the first possible computation output and the second possible computation output;
   sending information to the dealer node to enable the dealer node to determine the output of the computation from the first masked computation output.

2. A method as defined in statement 1, wherein the masked computation output is a sum of the computation output and the random mask.

3. A method as defined in statement 1 or 2, wherein the MAC of the masked computation output is a product of the masked computation output and the secret value.

4. A method as defined in any of statements 1-3, wherein the step of determining the output of the computation from the first possible computation output and the second possible computation output comprises:
 comparing the first possible computation output to the second possible computation output; and
 determining the output of the computation as the first possible computation output or the second possible computation output if the first possible computation output matches the second possible computation output.

5. A method as defined in statement 4, wherein, if the first possible computation output does not match the second possible computation output, the step of determining the output of the computation comprises:
 performing a MAC check on the first possible computation output; and
 determining the output of the computation as the first possible computation output if the MAC check is passed, and determining the output of the computation as the second possible computation output if the MAC check is failed.

6. A method as defined in any of statements 1-5, wherein the first masked computation output is broadcast from the dealer node.

7. A method as defined in any of statements 1-6, wherein the method further comprises the step of:
 sending the first computation output secret share to the second evaluator node.

8. A method as defined in any of statements 1-7, wherein the method further comprises the steps of:
 determining a commitment to the random mask; and
 sending the commitment to the dealer node.

9. A method as defined in any of statements 1-8, wherein the step of performing the computation further comprises:
 determining the result of a function of one or more parameters and the random mask as part of the computation with the second evaluator node, wherein the one or more parameters are provided as private inputs to the computation by the dealer node; and
 sending the result of the function of the one or more parameters and the random mask to the dealer node.

10. A method as defined in any of statements 1-9, wherein the step of sending information to the dealer node comprises sending the random mask or the first possible computation output to the dealer node.

11. A computer-implemented method of operating a dealer node to distribute a computation output, the method comprising:
 receiving, from a first evaluator node, a first masked computation output secret share of a masked computation output and a first Message Authentication Code, MAC, secret share of a MAC of the masked computation output, wherein the masked computation output is a function of an output of the computation and a random mask, and wherein the MAC of the masked computation output is a function of the masked computation output and a secret value;
 receiving, from the second evaluator node, a second masked computation output secret share of the masked computation output and a second MAC secret share of the MAC of the masked computation output;
 verifying the MAC of the masked computation output using the first masked computation output secret share, the first MAC secret share, the second masked computation output secret share, the second MAC secret share, and the secret value, wherein verifying the MAC of the masked computation output comprises combining the first masked computation output secret share and the second masked computation output secret share to determine the first masked computation output;
 if the MAC of the masked computation output is verified, sending the determined first masked computation output to the first evaluator node and the second evaluator node;
 receiving information from one or both of the first evaluator node and the second evaluator node; and
 determining the output of the computation from the first masked computation output and the received information.

12. A method as defined in statement 11, wherein the method further comprises the step of:
 terminating the method after the step of verifying the MAC if the MAC is not verified.

13. A method as defined in statement 11 or 12, wherein the method further comprises the steps of:
 receiving a first commitment to the random mask from the first evaluator node;
 receiving a second commitment to the random mask from the second evaluator node;
 comparing the first commitment and the second commitment; and
 terminating the method before the step of combining if the first commitment does not match the second commitment.

14. A method as defined in statement 13, wherein the method comprises proceeding with the step of sending if the first commitment matches the second commitment.

15. A method as defined in statement 13 or 14, wherein the received information comprises the random mask, and wherein the random mask is received from each of the first evaluator node and the second evaluator node, and the method further comprises the step of:
 determining which of the received random masks match the respective received commitment using the received random masks; and
 using a received random mask that matches the respective received commitment in determining the computation output from the first masked output.

16. A method as defined in statement 11 or 12, wherein the method further comprises the steps of:
 providing one or more parameters as private inputs to the computation performed by the first evaluator node and the second evaluator node;
 receiving, from each of the first evaluator node and the second evaluator node, a result of a function of the one or more parameters and the received information determined by the first evaluator node and the second evaluator node as part of the computation; and
 determining from the received results which received information is correct; and
 using correct received information in determining the computation output from the first masked output.

17. A method as defined in any of statements 11-16, wherein the received information comprises the random mask or a first possible computation output.

18. A method as defined in any of statements 11-17, wherein the method further comprises the step of:
 providing a respective secret value secret share of a secret value to each of the first evaluator node and the second evaluator node for use in forming the first MAC secret share and the second MAC secret share respectively.

19. A method as defined in any of statements 11-18, wherein the step of sending comprises broadcasting the first masked computation output to the first evaluator node and the second evaluator node.

20. A computer program product comprising a computer readable medium having computer readable code embodied therein, the computer readable code being configured such that, on execution by a suitable computer or processor, the computer or processor is caused to perform the method of any of statements 1-19.

21. A first evaluator node for use in distributing a computation output, wherein the first evaluator node is configured to:
receive a first secret value secret share of a secret value from a dealer node;
determine, with a second evaluator node, a random mask;
perform a computation with the second evaluator node to determine:
(i) a first masked computation output secret share of a masked computation output, wherein the masked computation output is a function of an output of the computation and the random mask; and
(ii) a first Message Authentication Code, MAC, secret share of a MAC of the masked computation output, wherein the MAC of the masked computation output is a function of the masked computation output and the secret value;
send the first masked computation output secret share and the first MAC secret share to the dealer node;
receive a first masked computation output from the dealer node;
receive a second computation output secret share from the second evaluator node, wherein the second computation output secret share is a secret share, determined by the second evaluator node, of the output of the computation;
determine a first possible computation output from a first computation output secret share and the received second computation output secret share, wherein the first computation output secret share is a secret share, determined by the first evaluator node when performing the computation, of the output of the computation;
determine a second possible computation output from the received first masked computation output and the random mask;
determine the output of the computation from the first possible computation output and the second possible computation output; and
send information to the dealer node to enable the dealer node to determine the output of the computation from the first masked computation output.

22. A first evaluator node as defined in statement 21, wherein the masked computation output is a sum of the computation output and the random mask.

23. A first evaluator node as defined in statement 21 or 22, wherein the MAC of the masked computation output is a product of the masked computation output and the secret value.

24. A first evaluator node as defined in any of statements 21-23, wherein the first evaluator node is configured to determine the output of the computation from the first possible computation output and the second possible computation output by:
comparing the first possible computation output to the second possible computation output; and
determining the output of the computation as the first possible computation output or the second possible computation output if the first possible computation output matches the second possible computation output.

25. A first evaluator node as defined in statement 24, wherein, the first evaluator node is configured to, if the first possible computation output does not match the second possible computation output, determine the output of the computation by:
performing a MAC check on the first possible computation output; and
determining the output of the computation as the first possible computation output if the MAC check is passed, and determining the output of the computation as the second possible computation output if the MAC check is failed.

26. A first evaluator node as defined in any of statements 21-25, wherein the first masked computation output is broadcast from the dealer node.

27. A first evaluator node as defined in any of statements 21-26, wherein the first evaluator node is further configured to:
send the first computation output secret share to the second evaluator node.

28. A first evaluator node as defined in any of statements 21-27, wherein the first evaluator node is further configured to:
determine a commitment to the random mask; and
send the commitment to the dealer node.

29. A first evaluator node as defined in any of statements 21-28, wherein the first evaluator node is configured to perform the computation by:
determining the result of a function of one or more parameters and the random mask as part of the computation with the second evaluator node, wherein the one or more parameters are provided as private inputs to the computation by the dealer node; and
sending the result of the function of the one or more parameters and the random mask to the dealer node.

30. A first evaluator node as defined in any of statements 21-29, wherein the first evaluator node is configured to send information to the dealer node by sending the random mask or the first possible computation output to the dealer node.

31. A dealer node for distributing a computation output, wherein the dealer node is configured to:
receive, from a first evaluator node, a first masked computation output secret share of a masked computation output and a first Message Authentication Code, MAC, secret share of a MAC of the masked computation output, wherein the masked computation output is a function of an output of the computation and a random mask, and wherein the MAC of the masked computation output is a function of the masked computation output and a secret value;
receive, from the second evaluator node, a second masked computation output secret share of the masked computation output and a second MAC secret share of the MAC of the masked computation output;
verify the MAC of the masked computation output using the first masked computation output secret share, the first MAC secret share, the second masked computation output secret share, the second MAC secret share, and the secret value, wherein verifying the MAC of the masked computation output comprises combining the first masked computation output secret share and the second masked computation output secret share to determine the first masked computation output;
if the MAC of the masked computation output is verified, send the determined first masked computation output to the first evaluator node and the second evaluator node;

receive information from one or both of the first evaluator node and the second evaluator node; and determine the output of the computation from the first masked computation output and the received information.

32. A dealer node as defined in statement 31, wherein the dealer node is configured to:

terminate after verifying the MAC if the MAC is not verified.

33. A dealer node as defined in statement 31 or 32, wherein the dealer node is configured to:

receive a first commitment to the random mask from the first evaluator node;

receive a second commitment to the random mask from the second evaluator node;

compare the first commitment and the second commitment; and terminate before the sending if the first commitment does not match the second commitment.

34. A dealer node as defined in statement 33, wherein the dealer node is configured to proceed with the sending if the first commitment matches the second commitment.

35. A dealer node as defined in statement 33 or 34, wherein the received information comprises the random mask, and wherein the random mask is received from each of the first evaluator node and the second evaluator node, and the dealer node is further configured to:

determine which of the received random masks match the respective received commitment using the received random masks; and use a received random mask that matches the respective received commitment in determining the computation output from the first masked output.

36. A dealer node as defined in statement 31 or 32, wherein the dealer node is further configured to:

provide one or more parameters as private inputs to the computation performed by the first evaluator node and the second evaluator node;

receive, from each of the first evaluator node and the second evaluator node, a result of a function of the one or more parameters and the received information determined by the first evaluator node and the second evaluator node as part of the computation; and determine from the received results which received information is correct; and use correct received information in determining the computation output from the first masked output.

37. A dealer node as defined in any of statements 31-36, wherein the received information comprises the random mask or a first possible computation output.

38. A dealer node as defined in any of statements 31-37, wherein the dealer node is further configured to:

provide a respective secret value secret share of a secret value to each of the first evaluator node and the second evaluator node for use in forming the first MAC secret share and the second MAC secret share respectively.

39. A dealer node as defined in any of statements 31-38, wherein the dealer node is configured to send by broadcasting the first masked computation output to the first evaluator node and the second evaluator node.

The invention claimed is:

1. A method of operating a first computing node to distribute a computation output, the method comprising:

determining a first random mask;

providing the first random mask as a private input to a multiparty computation by a first evaluator node and a second evaluator node, wherein the multiparty computation includes modifying, with the first evaluator node, a first computational output with the first random mask to generate a first masked computation output, and modifying, with the second evaluator node, a second computational output with the first random mask to generate a second masked computation output;

receiving, from each of the first evaluator node and the second evaluator node, a respective masked computation output of the first and second masked computation outputs;

if the first and second masked computation outputs match, determining a final output of the multiparty computation from the received first and second masked computation outputs and the first random mask;

providing a second random mask as a private input to the multiparty computation by the first evaluator node and the second evaluator node;

receiving, from each of the first evaluator node and the second evaluator node, a respective masked Message Authentication Code (MAC) of a respective one of the first and second computational outputs, wherein each masked MAC of the first and second computational outputs is a function of a MAC of a respective one of the first and second computational outputs and the second random mask;

if the received respective masked MACs do not match, bypassing transmission of information to the first evaluator node and the second evaluator node; and if the received respective masked MACs do match, sending the information to the first evaluator node and the second evaluator node to enable the first evaluator node and the second evaluator node to determine the final output of the multiparty computation from the first and second masked computation outputs.

2. A method as claimed in claim 1, wherein the method further comprises the step of:

terminating the method after the step of receiving, from each of the first evaluator node and the second evaluator node, the respective masked computation output if the received respective masked computation outputs do not match.

3. A method as claimed in claim 1, wherein the first and second masked computation outputs are broadcast from the first evaluator node and the second evaluator node respectively.

4. A method as claimed in claim 1, wherein the step of sending the information comprises sending the determined computation output or the first random mask to the first evaluator node and the second evaluator node.

5. A method as claimed in claim 1, wherein the method further comprises the steps of:

sending the information to the first evaluator node and the second evaluator node to enable the first evaluator node and the second evaluator node to determine the MACs of the first and second computational outputs from the respective masked MACs.

6. A computer program product comprising a computer readable medium having computer readable code embodied therein, the computer readable code being configured such that, on execution by a suitable computer or processor, the computer or processor is caused to perform the method of claim 1.

7. A method of operating a first evaluator node to distribute a computation output, the method comprising:

performing a first computation to determine a first computation output;

masking the first computation output with a first random mask to generate a first masked computation output, wherein the first random mask is provided as a private input to the first computation by a first computing node;
sending the first masked computation output to the first computing node;
receiving information from the first computing node;
determining a first possible computation output from the received information and the first masked computation output;
determining, with a second evaluator node, a second possible computation output;
determining a final computation output from the first possible computation output and the second possible computation output;
comparing the first possible computation output to the second possible computation output;
if the first possible computation output does not match the second possible computation output, the step of determining the final computation output further comprises:
checking together with the second evaluator node whether the second possible computation output is correct according to a MAC check on the second possible computation output and
determining the final computation output as the second possible computation output if the second possible computation output is correct, and determining the final computation output as the first possible computation output if the second possible computation output is not correct.

8. A method as claimed in claim 7, wherein the step of sending comprises broadcasting the first masked computation output to the first computing node.

9. A method as claimed in claim 7, wherein the method further comprises:
receiving a second masked computation output from the second evaluator node; and
terminating the method after receiving the second masked computation output if the received first masked computation output does not match the second masked computation output.

10. A method as claimed in claim 7, wherein the step of determining a second possible computation output comprises:
receiving a second computation output secret share from the second evaluator node, wherein the second computation output secret share is a secret share, determined by the second evaluator node when performing the computation; and
determining the second possible computation output from a first computation output secret share and the second computation output secret share, wherein the first computation output secret share is a secret share of an output of the computation determined by the first evaluator node when performing the computation.

11. A method as claimed in claim 10, wherein the method further comprises the step of:
sending the first computation output secret share to the second evaluator node.

12. A method as claimed in claim 7, wherein the step of determining the final computation output comprises:
determining the final computation output as the first possible computation output or the second possible computation output if the first possible computation output matches the second possible computation output.

13. A method as claimed in claim 12, wherein the step of checking comprises performing a Message Authentication Code (MAC) check on the first possible computation output and a MAC of the second possible computation output.

14. A method as claimed in claim 7, wherein the method further comprises the steps of:
determining, with the second evaluator node, a Message Authentication Code (MAC) key;
wherein the step of performing the computation further determines a masked MAC of the first computation output, wherein the masked MAC of the first computation output is a function of a MAC of an output of the computation determined using the MAC key, and a second random mask, wherein the second random mask is provided as a private input to the computation by the first computing node;
sending the masked MAC of the first computation output to the first computing node;
receiving second information from the first computing node;
determining the MAC of the first computation output from the second information and the masked MAC of the first computation output; and
determining the final computation output as the first possible computation output if the MAC of the first computation output matches a MAC of the first possible computation output determined using the MAC key.

15. A method as claimed in claim 14, wherein the MAC key comprises first and second field elements, and wherein the MAC of the output of the computation is a sum of the first field element and a product of the output of the computation and the second field element.

16. A method as claimed in claim 14, wherein the method further comprises the steps of:
if the MAC of the first computation output does not match the MAC of the first possible computation output, receiving a second computation output secret share from the second evaluator node, wherein the second computation output secret share is a secret share, determined by the second evaluator node, of an output of the computation; and
determining the computation output from a first computation output secret share and the second computation output secret share, wherein the first computation output secret share is a secret share, determined by the first evaluator node when performing the computation, of an output of the computation.

17. A first computing node for distributing a computation output, wherein the first computing node is configured to:
determine a first random mask;
provide the first random mask as a private input to a multiparty computation by a first evaluator node and a second evaluator node, wherein the multiparty computation includes modifying, with the first evaluator node, a first computational output with the first random mask to generate a first masked computation output, and modifying, with the second evaluator node, a second computational output with the first random mask to generate a second masked computation output;
receive, from each of the first evaluator node and the second evaluator node, a respective masked computation output of the first and second masked computation outputs;
determine a final output of the multiparty computation from the received first and second masked computation outputs and the first random mask if the received respective first and second masked computation outputs match;

provide a second random mask as a private input to the multiparty computation by the first evaluator node and the second evaluator node;

receive, from each of the first evaluator node and the second evaluator node, a respective masked Message Authentication Code (MAC) of a respective one of the first and second computational outputs, wherein each masked MAC of the first and second computational outputs is a function of a MAC of a respective one of the first and second computational outputs and the second random mask;

if the received respective masked MACs do not match, bypass transmission of information to the first evaluator node and the second evaluator node; and if the received respective masked MACs do match, send the information to the first evaluator node and the second evaluator node to enable the first evaluator node and the second evaluator node to determine the final output of the multiparty computation from the first and second masked computation outputs.

18. A first computing node as claimed in claim 17, wherein the first computing node is further configured to:
terminate after receiving, from each of the first evaluator node and the second evaluator node, the respective masked computation output if the received respective masked computation outputs do not match.

19. A first computing node as claimed in claim 17, wherein the first and second masked computation outputs are broadcast from the first evaluator node and the second evaluator node respectively.

20. A first computing node as claimed in claim 17, wherein the first computing node is configured to send the determined computation output or the first random mask to the first evaluator node and the second evaluator node.

21. A first computing node as claimed in claim 17, wherein the first computing node is further configured to:
send the information to the first evaluator node and the second evaluator node to enable the first evaluator node and the second evaluator node to determine the MACs of the first and second computational outputs from the respective masked MACs.

22. A first evaluator node for distributing a computation output, wherein the first evaluator node is configured to:
perform a first computation to determine a first computation output;
mask the first computation output with a first random mask to generate a first masked computation output, wherein the first random mask is provided as a private input to the first computation by a first computing node;
send the first masked computation output to the first computing node;
receive information from the first computing node;
determine a first possible computation output from the received information and the first masked computation output;
determine, with a second evaluator node, a second possible computation output;
determine a final computation output from the first possible computation output and the second possible computation output;
compare the first possible computation output to the second possible computation output;
wherein, the first evaluator node is configured to, if the first possible computation output does not match the second possible computation output, determine the final computation output by:

checking together with the second evaluator node whether the second possible computation output is correct; and determining the final computation output as the second possible computation output if the second possible computation output is correct, and determining the final computation output as the first possible computation output if the second possible computation output is not correct.

23. A first evaluator node as claimed in claim 22, wherein the first evaluator node is configured to broadcast the first masked computation output to the first computing node.

24. A first evaluator node as claimed in claim 22, wherein the first evaluator node is further configured to:
receive a second masked computation output from the second evaluator node; and
terminate after receiving the second masked computation output if the received first masked computation output does not match the second masked computation output.

25. A first evaluator node as claimed in claim 22, wherein the first evaluator node is configured to determine a second possible computation output by:
receiving a second computation output secret share from the second evaluator node, wherein the second computation output secret share is a secret share, determined by the second evaluator node when performing the computation; and
determining the second possible computation output from a first computation output secret share and the second computation output secret share, wherein the first computation output secret share is a secret share of an output of the computation determined by the first evaluator node when performing the computation.

26. A first evaluator node as claimed in claim 25, wherein the first evaluator node is further configured to:
send the first computation output secret share to the second evaluator node.

27. A first evaluator node as claimed in claim 22, wherein the first evaluator node is configured to determine the final computation output by:
determining the final computation output as the first possible computation output or the second possible computation output if the first possible computation output matches the second possible computation output.

28. A first evaluator node as claimed in claim 22, wherein the first evaluator node is configured to check by performing a Message Authentication Code (MAC) check on the first possible computation output and a MAC of the second possible computation output.

29. A first evaluator node as claimed in claim 22, wherein the first evaluator node is further configured to:
determine, with the second evaluator node, a Message Authentication Code (MAC) key;
wherein the first evaluator node is configured to perform the computation by determining a masked MAC of the first computation output, wherein the masked MAC of the first computation output is a function of a MAC of an output of the computation determined using the MAC key, and a second random mask, wherein the second random mask is provided as a private input to the computation by the first computing node;

send the masked MAC of the first computation output to the first computing node;

receive second information from the first computing node;

determine the MAC of the first computation output from the second information and the masked MAC of the first computation output; and determine the final computation output as the first possible computation output if the MAC of the first computation output matches a MAC of the first possible computation output determined using the MAC key.

30. A first evaluator node as claimed in claim 29, wherein the MAC key comprises first and second field elements, and wherein the MAC of the output of the computation is a sum of the first field element and a product of the output of the computation and the second field element.

31. A first evaluator node as claimed in claim 29, wherein the first evaluator node is further configured to:

receive a second computation output secret share from the second evaluator node if the MAC of the first computation output does not match the MAC of the first possible computation output, wherein the second computation output secret share is a secret share, determined by the second evaluator node, of an output of the computation; and determine the computation output from a first computation output secret share and the second computation output secret share, wherein the first computation output secret share is a secret share, determined by the first evaluator node when performing the computation, of an output of the computation.

* * * * *